(12) United States Patent
Southard

(10) Patent No.: US 7,476,316 B2
(45) Date of Patent: Jan. 13, 2009

(54) MOLECULARLY IMPRINTED POLYMERS (MIPS) FOR THE SELECTIVE REMOVAL OF INORGANIC CONTAMINANTS FROM LIQUIDS

(75) Inventor: Glen E. Southard, Park City, UT (US)

(73) Assignee: MIP Solutions, Inc., Spokane, WA (US)

( * ) Notice: Subject to any disclaimer, the term of this patent is extended or adjusted under 35 U.S.C. 154(b) by 302 days.

(21) Appl. No.: 11/520,448

(22) Filed: Sep. 12, 2006

(65) Prior Publication Data

US 2007/0090058 A1  Apr. 26, 2007

Related U.S. Application Data

(60) Provisional application No. 60/716,579, filed on Sep. 12, 2005, provisional application No. 60/716,433, filed on Sep. 12, 2005.

(51) Int. Cl.
*B01D 39/00* (2006.01)
(52) U.S. Cl. .................. 210/502.1; 210/510.1
(58) Field of Classification Search .............. 210/502.1, 210/510.1; 564/288, 384
See application file for complete search history.

(56) References Cited

U.S. PATENT DOCUMENTS

| | | | |
|---|---|---|---|
| 4,248,797 A * | 2/1981 | Glavis et al. ................. | 564/288 |
| 5,814,671 A | 9/1998 | Murray | |
| 5,872,198 A | 2/1999 | Mosbach et al. | |
| 5,959,050 A * | 9/1999 | Mosbach et al. ............ | 526/201 |
| 6,489,418 B1 | 12/2002 | Mosbach | |
| 6,749,811 B2 | 6/2004 | Murray | |
| 6,780,323 B2 | 8/2004 | Murray | |
| 6,872,786 B2 | 3/2005 | Murray et al. | |
| 6,967,103 B2 | 11/2005 | Schwartz et al. | |
| 7,393,909 B2 * | 7/2008 | Sellergren et al. ........... | 526/346 |
| 2003/0003587 A1 | 1/2003 | Murray | |
| 2003/0027936 A1 | 2/2003 | Murray et al. | |
| 2003/0059346 A1 | 3/2003 | Murray | |
| 2003/0100118 A1 | 5/2003 | Kelly et al. | |
| 2003/0113234 A1 | 6/2003 | Murray | |
| 2003/0129092 A1 | 7/2003 | Murray | |
| 2003/0143119 A1 | 7/2003 | Schwartz et al. | |
| 2004/0118682 A1 | 6/2004 | Murray et al. | |
| 2004/0265178 A1 | 12/2004 | Murray | |
| 2005/0019218 A1 | 1/2005 | Murray et al. | |
| 2005/0019302 A1 | 1/2005 | Murray | |

FOREIGN PATENT DOCUMENTS

WO    WO 2005/038734    4/2005

OTHER PUBLICATIONS

Durie et al., One-Pot Synthesis of Branched Poly (styrene-divinylbenzene) Suspension Polymerized Resins, Macromolecules, 2002, 9655-9672, 35.

Bae et al., Molecularly imprinted ion exchange resin for purification, preconcentration and determination of $UO_2+$ by spectrophotometry and plasma spectrometry, Analytica Chimica Acta, 1999, pp. 173-181, 397.
Zeng et al., Synthesis and Characterization of Site-Selective Ion-Exchange Resins Templated for Lead(II) Ion, Separation Science and Technology, 1996, pp. 2403-2418, 31(17.
Dambies et al., Immobilized N-Methyl-D-glucamine as an Arsenate-Selective Resin, Environmental Science & Technology, 2004, 6139-6146, vol. 38, No. 22.
Shimizu et al., Characterization of MIPs Using Heterogeneous Binding Models, Mat. Res. Soc. Symp. Proc, 2002, pp. 17-22, vol. 723.
Yilmaz et al., A facile method for preparing molecularly imprinted polymer spheres using spherical silica templates, J. Mater. Chem., 2002, 1577-1581, 12.
George M. Murray and Glen E. Southard, Synthetic and Spectroscoptic Characterization of Molecularly Imprinted Polymer Phosphonate Sensors, Polym. Preprints, 2004, 535-536, 45(1).
Zimmerman et al., Molecular Imprinting Inside Dendrimers, Am. Chem. Soc., 2003, 13504-13518, 125(44).
Huhtinen et al., Synthesis, Characterization, and Application of Eu(III), Tb(III), Sm(III), and Dy (III) Lanthanide Chelate Nanoparticle Labels, Anal. Chem., 2005, 2643-2648, 77, Department of Biotechnology, University of Turku, Finland.
Braun et al., Ion-Selective Exchange Resin Through Cross-linking Copolymerization of Vinyl-Substituted Metal Complexes, Chemist Newspaper, 108, 1984.
Southard et al., Soluble and Processable Phosphonate Sensing Star Molecularly Imprinted Polymers, 20 pages, John Hopkins University Applied Physics Laboratory, submitted, no date.
Guo et al., Preparation and Properties of Uniform-Sized Polymer Beads Imprinted with N-CBZ-L-Phenylalanine, International Journal of Polymeric Materials, Aug. 2005, pp. 743-755, vol. 54, No. 8.
Chen et al., Preparation and evaluation of uniform-sized molecularly imprinted polymer beads used for the separation of sulfamethazine, Biomedical Chromatography, 2005, 533-538, 19, Wiley InterScience www.interscience.wiley.com.
Zhang et al., Tyrosine Imprinted Polymer Beads With Different Functional Monomers via Seed Swelling and Suspension Polymerization, Polymer Engineering and Science, Apr. 2003, pp. 965-974, vol. 43.
Titirici et al., Hierarchically Imprinted Stationary Phases: Mesoporous Polymer Beads Containing Surface-Confined Binding Sites for Adenine, Chem. Meter., 2002, pp. 21-23, 14(1).
Owens et al., Molecularly Imprinted Ion Exchange Resin for Fe, Sep. Sci. Tech., 2002, 3 pages, CheComm, www.rsc.org/chemcomm.

* cited by examiner

*Primary Examiner*—Chester T Barry
(74) *Attorney, Agent, or Firm*—Thorpe North & Western LLP

(57) ABSTRACT

A method of creating a cationic molecularly imprinted polymer bead that can bind inorganic target compounds is disclosed and described. The cationic molecularly imprinted polymer bead can be formed by complexing a target compound with a cationic ligand, polymerizing the cationic ligands to form the bead, and then extracting the target compound from the bead. The cationic ligand complex can have an octanol water partition coefficient of about 1 to about 10. The cationic molecularly imprinted polymer bead can have a porous structure containing a plurality of complexing cavities for selectively bind specific target compounds for removal from potable water, mine effluent, industrial effluent, or other fluids.

7 Claims, No Drawings

MOLECULARLY IMPRINTED POLYMERS (MIPS) FOR THE SELECTIVE REMOVAL OF INORGANIC CONTAMINANTS FROM LIQUIDS

RELATED APPLICATIONS

This application claims the benefit of U.S. Provisional Application Ser. No. 60/716,433 filed on Sep. 12, 2005 and U.S. Provisional Application Ser. No. 60/716,579 filed on Sep. 12, 2005, both of which are incorporated herein by reference.

FIELD OF THE INVENTION

The present invention relates generally to molecularly imprinted polymers. More particularly, the present invention relates to cationic molecularly imprinted polymer beads for binding target compounds. As such, the present invention involves the fields of chemistry, polymers, and materials science.

BACKGROUND

The extraction of contaminants and/or the recovery of trace elements from liquids can involve considerable time, energy, and expense. Extraction and recovery processes are commonly performed in water purification, mining, and waste treatments. Water purification is a multimillion dollar industry involving a variety of commercially available products and processes. Typically water purification techniques include: boiling, carbon filtering, distillation, reverse osmosis, ion exchange, and electrodeionization. While these techniques can be effective, they can also be cost-prohibitive.

Mining involves the process of extracting minerals from the earth. The mining industry uses a variety of physical and chemical extraction methods including grinding, crushing, washing, blasting, froth flotation, solvent extraction, smelting, electrostatic separation, magnetic separation, etc. While these techniques are well known, they can also be cost-prohibitive and inefficient.

Waste treatments generally involve the removal of specific contaminants from matter by techniques that change the physical, chemical, or biological character of the waste, to reduce its volume and/or toxicity, and to make the waste safer for disposal. Waste treatments are designed based on the physical and chemical properties of the waste. For example, for simple solid combustible materials, incineration can be used as a method of disposal. For mixed solid and liquid residential waste, compaction in landfills is typically used. While both methods have been employed for centuries, neither is optimal for the treatment of waste comprised substantially of liquids.

Compaction generally removes air from solid waste thereby reducing the overall volume. However, liquid waste contains only an insignificant amount of gas, and therefore, compaction offers little to no value. Incineration of solid waste requires little energy as the combustion reactions are generally self-sustaining. However, the combustion of most liquids is not self-sustaining and requires a continual source of energy to sustain the reaction thereby becoming cost prohibitive. Even if liquid waste could be changed readily from a liquid to a gas, such a transformation may not be desirable due to pollutants present in the waste, which may become airborne with the liquid. A more efficient means to handle liquid waste is generally to remove any contaminants from the liquid and to either reuse or return the liquid to the environment.

For example, typically, sewage treatment involves three stages, referred to as primary, secondary, and tertiary treatments. First, the solids are separated from the wastewater stream. Second, dissolved biological matter is progressively converted into a solid mass by using indigenous, water-borne bacteria. Finally, the biological solids are neutralized then disposed or re-used, and the treated water may be disinfected chemically using natural or synthetic resins or physically by lagooning or micro-filtration. The final effluent can be discharged into a natural surface water body (stream, river or bay) or other environment (wetland, golf course, greenway, etc.).

Commercial waste treatments generally involve more complex treatments due to the nature of the waste. For example, wastewater from metal mines and ore recovery plants are inevitably contaminated by the minerals present in the native rock formations. Typical contaminants include: iron, chromium, cobalt, uranium, mercury, nickel, antimony, arsenic, aluminum, cadmium, lead, manganese, copper, and zinc in various forms. Similarly, acceptable standards for certain contaminant ions in potable water continue to decrease. Various methods have been used to reduce these contaminants including chemical precipitation, ion exchange, reverse osmosis, solvent extraction (liquid ion exchange), electrodialysis, and chemical reduction. However, these procedures can have disadvantages such as limited metal or contaminant removal, high reagent and energy requirements, exorbitant costs, and generation of toxic sludge or other waste products requiring further disposal.

As such, advances in cost effective techniques and processes for isolation and removal or recovery of inorganic contaminants and trace elements from liquids, which are commercially feasible, continue to be sought through ongoing research and development efforts.

SUMMARY OF THE INVENTION

It has been recognized that it would be advantageous to develop an effective and efficient method for extraction, removal, and/or recovery of target compounds from a liquid.

Briefly, and in general terms, the invention is directed to a method of creating a cationic molecularly imprinted polymer bead that can bind target compounds. The cationic molecularly imprinted polymer bead can be formed by complexing a target compound with at least one cationic ligand, the target cationic ligand complex having an octanol water partition coefficient with an absolute value from 1 to 10, polymerizing the cationic ligands to form the bead, and then extracting the target compound from the bead. The cationic molecularly imprinted polymer bead can have a porous structure containing a plurality of complexing cavities for selectively binding specific target compounds.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION OF THE INVENTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a cationic ligand" includes one or more of such ligands, reference to "an amount of beads" includes reference to one or more amounts of beads, and reference to "the target compounds" includes reference to one or more target compounds.

Definitions

In describing and claiming the present invention, the following terminology will be used in accordance with the definitions set forth below.

As used herein, the term "molecularly imprinted polymer" or "MIP" refers to synthetic polymers that have been tailored to selectively bind a particular compound. The molecularly imprinted polymer is synthesized in the presence of target compounds, also referred to as template compounds, creating a MIP with a high degree of affinity for the specific target compound. Generally, the polymers are constructed with ligands spatially orientated forming the cavities that conform to the shapes of the associated target compounds. Specifically, the target compounds are incorporated into a pre-polymeric mixture and allowed to form bonds with the ligands. The mixture is then polymerized with the target compounds in place. Once the polymer has formed, the target compounds are removed, leaving behind cavities corresponding to the target compound. Such cavities are thus tailored for binding future target compounds giving rise to a high affinity for such compounds over other competing ions.

It is worthy to note, that while specific target compounds are used to form molecularly imprinted polymers, the polymers may have a high affinity for a class of compounds that is similar to the target compound. A molecularly imprinted polymer may bind a number of compounds that are similar in shape, charge density, geometry or other physical or chemical properties.

As used herein, the term "cationic" or "cation" refers to an ion that has a positive charge. This term can refer to polymeric compounds, such as molecularly imprinted polymers, that contain a positive charge.

As used herein, the term "anionic" or "anion" refers to an ion that has a negative charge.

As used herein, the term "oxyanion" refers to an anion that contains at least one oxygen atom.

As used herein, the term "ion" refers to an atom or group of atoms chemically bonded that have a positive or negative charge. This term includes all compounds even when referred to as polyatomic ions, coordinated complexes, molecularly imprinted polymers, etc. that have a negative or positive charge.

As used herein, the term "bind," "binding," "bond," "bonded," or "bonding" refers to the physical phenomenon of chemical species being held together by attraction of atoms to each other through sharing, as well as exchanging, of electrons or protons. This term includes bond types such as: ionic, coordinate, hydrogen bonds, covalent, polar covalent, or coordinate covalent. Other terms used for bonds such as banana bonds, aromatic bonds, or metallic bonds are also included within the meaning of this term.

As used herein, "reaction" is intended to cover single step and multi-step reactions which can be direct reactions of reactants to products or may include one or more intermediate species which can be stable or transient.

As used herein, the term "fluid" refers to any material that has the ability to flow, which can also be described as the ability to take the shape of its container, or does not resist deformation. This term includes liquids or gases. This term also includes non-Newtonian fluids, i.e. fluids with viscosities that change with an applied strain rate, and Newtonian fluids, i.e. fluids with viscosities that are nearly constant regardless of applied forces.

As used herein, the term "ligand" refers to an atom, ion, or molecule that generally donates or shares one or more of its electrons through a bond with one or more atoms, ions, or molecules.

As used herein, the term "coordination site" refers to a specific location on a ligand or target compound that is capable of donating or accepting an electron or pair of electrons with a molecule.

As used herein, the term "complexing cavity" refers to the void in a molecularly imprinted polymer bead formed by the extraction of the template or target compound after formation of the bead through polymerization.

As used herein, the term "target cationic ligand complex" refers to the complex formed when the cationic ligand bonds to the complexing cavity. This term includes the formation of the complex within a molecularly imprinted polymer bead as well as a precursor to bead formation.

As used herein, the term "octanol water partition coefficient" refers to the log of the ratio of a compound concentration in the octanol phase to its concentration in the aqueous phase of a two-phase octanol/water system. The octanol water partition coefficient is not the same as the log of the ratio of a compound's solubility in octanol to its solubility in water, because the organic and aqueous phase of the binary octanol/water system is not pure octanol and pure water. Each has slight solubility in each other, so an accurate octanol water partition coefficient is typically determined by dissolving less than 0.1 mol/L of the compound in a two-phase octanol water system followed by an appropriate analytical method to determine the relative concentrations in each phase.

As used herein, the term "bead" refers to a spherical polymeric material where the spherical shape is formed during the polymerization reaction, i.e. the bead is created in situ. This term does not include spherical polymeric material where the spherical shape is created by mechanical means after the polymerization reaction is completed.

As used herein, the term "template compound" or "target compound" refers to a compound that can be complexed by ligands that are subsequently polymerized, forming a molecularly imprinted polymer. This term preferably includes inorganic compounds only but may also include low molecular weight organic compounds as well. Low molecular weight organic compounds can be organic compounds with a molecular weight of 250 atomic mass units (a.m.u.) or less. Preferably, the organic compounds have a molecular weight of 100 a.m.u. or less.

As used herein, the term "inorganic contaminant" or "inorganic compound" refers to any compound that is not an organic compound that is mixed or in contact with a fluid causing the fluid to be impure, unusable, or undesirable in solution. Inorganic contaminants or compounds are those that are not hydrocarbons and can include, for example, metal or semi-metal ions or oxyanions, formates, oxalates, and functionalized metals, i.e. metal carboxylates, metal alkoxides, metal ammines, metal amides, metal cyanides, phosgenes, metal carbonyls, and others as would be recognized by those skilled in the art. Compounds that are regulated in waste streams, potable water supplies, or other fluids are included within the meaning of this term.

As used herein, the term "organic compound" refers to any compound that contains hydrocarbons, their derivatives, carbon compounds except carbon oxides, carbonates, carbides and disulfide, and the like as recognized by those skilled in the art. Generally, organic compounds are those such as aliphatic hydrocarbons, cyclic hydrocarbons, organometallic compounds, synthetic polymers, among others.

As used herein, the term "substantially" or "substantial" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still contain such an item as long as there is no measurable effect thereof.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3.5, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

The Invention

Molecularly imprinted polymers (MIPs) represent a class of polymers that are designed for binding specific compounds. The present invention is directed to cationic molecularly imprinted polymer beads for binding target compounds in a fluid. A cationic molecularly imprinted polymer bead can be prepared by complexing a target compound with cationic ligands, thereby forming a contaminant cationic ligand complex having an octanol water partition coefficient with an absolute value from about 1 to about 10. The contaminant cationic ligand complex can then be polymerized through functional groups on the ligands. The target compound can then be extracted from the cationic molecularly imprinted polymer bead. In one embodiment, the polymerizing step can further include a cross-linking of the polymerized ligands to achieve a more rigid structure. In another embodiment, the polymerization reaction can be a suspension polymerization. Although suspension polymerization provides a bead structure, any polymerization reaction that provides for a substantial bead structure in situ is contemplated by the present invention, as known by those skilled in the art.

The cationic ligand can be any compound capable of bonding with a target compound forming a complex that can be polymerized. One limitation that can affect polymerization is the solubility of the ligands in the polymerization reaction solvent. The octanol water partition coefficient generally provides a measurement of a compound's solubility in an organic medium compared to an aqueous medium. In one embodiment, the cationic ligand can have an octanol water partition coefficient from about 1 to about 10. In another embodiment, the target cationic ligand complex can have an octanol water partition coefficient with an absolute value from about 1 to about 10. The octanol water partition coefficient provides a means of screening ligands and ligand complexes with low solubility that could reduce overall reaction yields. In a preferred embodiment, the octanol water partition coefficient can have an absolute value from about 1.0 to about 3.0. The absolute value of the octanol water partition coefficient can be used to select appropriate reactants for reverse suspension polymerization reactions that require higher solubility in water as well as suspension reactions that require higher solubility in organic solvents. By limiting the range of the octanol water partition coefficient, the overall yield of the ligand complex in the polymerization reaction can be increased. In one embodiment, the reaction yield of the cationic molecularly imprinted polymer bead can be from about 10% to about 99.9%. Preferably, the reaction yield can be about 75% to about 99.9%.

In another aspect of the present invention, solubility parameters for the cationic ligands and associated complexes in the particular solvent system used in polymerization can be useful in choosing suitable ligands. See "Immergut, E. H.; et. al. *Polymer Handbook*, John Wiley and Sons, New Jersey, 1999, pp. 675-714, which is incorporated herein by reference. Generally, the greater the difference between the solubility parameter, $\delta$, between two liquids the more immiscible they are. For example, $\delta$ for n-pentane is 14.3, 1-pentanol is 20.5, 1,5-pentanediol is 23.5, and water is 47.9. n-Pentane is completely immiscible with water, 1-pentanol is only 2.3% weight/weight soluble in water, and 1,5-pentanediol is completely miscible with water. In context of the present invention for suspension polymerization, it is desirable to maximize solubility in the solvent phase while minimizing solubility in the second phase. As a general guideline, the cationic ligand can have a solubility parameter from about 10 to about 20.

General classes of cationic ligands that can be used in the present method include, but are not limited to, cationic oxygen containing heterocyclics, cationic nitrogen containing heterocyclics, cationic sulfur containing heterocyclics, cationic phosphorous containing heterocyclics, ammonium salts, phosphonium salts, acylinium salts, metallocenium salts, amidinium salts, imminium salts, and trityl salts. In one embodiment, the ligand can be 4-vinylbenzyl-N,N-dimethyl-N-decylammonium, 4-vinylbenzyl-N-decyl-N-methylglucammonium, N-methyl vinylpyridinium, or 4-vinylbenzyl-N,N-dimethyl-D-glucammonium. In one embodiment, N-methyl vinylpyridinium and 4-vinylbenzyl-N,N-dimethyl-D-glucammonium can be used in a reverse suspension polymerization reaction. 4-vinylbenzyl-N,N-dimethyl-N-decylammonium have shown particularly good results for use in removal of gold-containing cations from water. In another embodiment, 4-vinylbenzyl-N,N-dimethyl-N-decylammonium and 4-vinylbenzyl-N-decyl-N-methylglucammonium can be used in a suspension polymerization reaction. These two ligands have shown good results with respect to removal of arsenate from water.

General classes of target compounds contemplated by the present method include, but are not limited to halogens, cyanides, oxyanions of antimony, oxyanions of arsenic, oxyanions of beryllium, oxyanions of bromine, oxyanions of carbon, oxyanions of chlorine, oxyanions of chromium, oxyanions of nitrogen, oxyanions of phosphorous, oxyanions of selenium, oxyanions of sulfur, oxyanions of manganese, oxyanions of technetium, oxyanium of boron, oxyanions of vanadium, molybdenum anions, tungsten anions, and mixtures thereof. In one embodiment, the target compound can be arsenate, arsenite, nitrate, nitrite, cyanide, dicyanoaurate, or dicyanoargentate. The methods of the present invention can also be used with non-anionic classes of compounds known to those skilled in the art.

The number of ligands needed to form a target cationic ligand complex depends on the functionality of the ligand and the target compound. At a minimum, the ligand must be able to bind the target compound and be able to be polymerized into a cationic molecularly imprinted polymer bead. The target compound and the ligand can have multiple coordination sites capable of bonding. The ligand can be monodentate, bidentate or polydentate. A monodentate ligand can bond to only one coordination site. A bidentate ligand has the ability to bond to two separate coordination sites on a molecule simultaneously. Similarly, a polydentate ligand can simultaneously bind to multiple coordination sites. A ligand may contain more than one coordination site capable of bonding to a molecule but may nevertheless be a monodentate ligand if only one coordination site can bond to a molecule at any given moment. This limitation may be due to stereochemistry of the ligand coordination sites.

The present invention includes the use of monodentate, bidentate, and polydentate ligands. The amount and type of ligands needed for a given cationic molecularly imprinted polymer bead would depend on the number of coordination sites available on the target compound and the associated ligands. Numerous combinations are possible. For example, a target cationic ligand complex may contain a target compound with 4 coordination sites. This target compound could form a number of combinations with a monodentate ligand or a bidentate ligand. The target compound could then bond to 1 to 4 monodentate ligands or 1 to 2 bidentate ligands, assuming each ligand fully coordinates with the target compound. Of course, the methods of the present invention contemplate partial coordination by the ligand and/or target compound. For example, the target cationic ligand complex could have 1 to 4 monodentate ligands or 1 to 4 bidentate ligands. Those skilled in the art can form multiple combinations of ligands and target compounds based on the physical and chemical properties of each and the disclosure herein. In one embodiment, a mixture of ligands can be used to bind a specific target compound.

The target cation ligand complex can be formed by a combination of ligands and target compounds that provides an overall stable complex. The methods of the present invention include target cationic ligand complexes that limit side oxidation/reduction (redox) reactions during polymerization. In one embodiment, the target cationic ligand complex has a redox potential of at least 0.3 eV versus SCE (standard calomel electrode). Additionally, the target cation ligand complex can be formed at various pH ranges. In one embodiment, the target cationic ligand complex can be formed in a pH range of 1 to 13. In another embodiment, the target cationic ligand complex can be polymerized in a pH range of 5 to 9.

The methods of the present invention provide a cationic molecularly imprinted polymer bead that can selectively remove target compounds from a liquid. The liquid can be a waste stream, potable water supply, mining waste stream, or other type of liquid that contains target compounds. Additionally, target compounds can be removed from other fluids, as defined herein, by cationic molecularly imprinted polymer beads. Generally, the present method includes contacting the cationic molecularly imprinted polymer bead with a liquid for a sufficient amount of time that allows the liquid to penetrate the bead. After the liquid penetrates the bead, the complexing cavities contained in the bead will bind the target compound upon contact, effectively removing the target compound from the liquid. The liquid can then be further processed or disposed in an appropriate manner. The cationic molecularly imprinted polymer bead used for removing target compounds can be produced by any of the previously discussed methods or other methods known by those skilled in the art.

The method of removing target compounds from a liquid can use cationic molecularly imprinted polymer beads that contain cationic ligands or target cationic ligand complexes having an octanol water partition coefficient with an absolute value from about 1 to about 10; preferably from about 1.0 to about 3.0. The cationic ligands can be, but are not limited to, cationic oxygen containing heterocyclics, cationic nitrogen containing heterocyclics, cationic sulfur containing heterocyclics, cationic phosphorous containing heterocyclics, ammonium salts, phosphonium salts, acylinium salts, metallocenium salts, amidinium salts, imminium salts, trityl salts, or mixtures thereof. In one embodiment, the ligand can be 4-vinylbenzyl-N,N-dimethyl-N-decylammonium, 4-vinylbenzyl-N-decyl-N-methyl-D-glucammonium, N-methyl vinylpyridinium, or 4-vinylbenzyl-N,N-dimethyl-D-glucammonium. The target compound can be, but is not limited to, halogens, cyanides, oxyanions of antimony, oxyanions of arsenic, oxyanions of beryllium, oxyanions of bromine, oxyanions of carbon, oxyanions of chlorine, oxyanions of chromium, oxyanions of nitrogen, oxyanions of phosphorous, oxyanions of selenium, oxyanions of sulfur, oxyanions of manganese, oxyanions of technetium, oxyanium of boron, oxyanions of vanadium, molybdenum anions, tungsten anions, and mixtures thereof. In one embodiment, the target compound can be arsenate, arsenite, nitrate, nitrite, cyanide, dicyanoaurate or dicyanoargentate. The cationic molecularly imprinted polymer bead can be cross-linked to provide a rigid structure that can withstand the physical and chemical forces associated with the removal process. The degree of crosslinking can affect the selectivity for the target compound and use of use. For example, a high degree of crosslinking can increase selectivity; however, removal of the target compound can become more difficult. Solvents or other materials which cause the bead to temporarily swell can help in the removal of target compounds.

In one embodiment, the method of removing target compounds from a liquid can be highly selective. The liquid can contain a multitude of target compounds where the cationic molecularly imprinted polymer bead selectively removes one specific target compound, where "one" refers to the type of target compound and not the number of target compounds removed. The bead can have a high affinity for a single molecule or a group of molecules having a common chemical or physical property. Additionally, the cationic molecularly imprinted polymer beads can contain different complexing cavities for different target compounds such that the bead is able to selectively bind multiple target compounds.

In a preferred embodiment, the method of removing inorganic contaminants or target compounds from a liquid comprises a plurality of cationic molecularly imprinted polymer beads. The method can include individual groups of beads designed to bind different inorganic contaminants or target compounds. For example, a waste stream can be analyzed to determine the specific inorganic contaminants contained therein. The method of removal can then constitute designing an appropriate filter or other housing containing groups of beads for binding those specific inorganic contaminants. One possible combination can include the following contaminants: arsenate, cyanide, and nitrate. For this combination, a method can include a filter containing a plurality of cationic molecularly imprinted polymer beads for binding arsenate, a plurality of cationic molecularly imprinted polymer beads for binding cyanide, and a plurality of cationic molecularly imprinted polymer beads for binding nitrate. Numerous combinations of bead mixtures can be formulated based on the contaminated liquids. Such multiple bead systems can be presented as a mixture of different bead types and/or in multiple beds fluidly linked in series.

Used beads can then be recycled or disposed of in an appropriate manner. For example, target compounds can be removed via washing with a suitable solvent, i.e. thiocyanate, or the like. The recycled beads can then be returned to use. Further, the materials and methods of the present invention are particularly suitable for recovery and extraction of valuable materials from fluids. For example, gold compounds such as dicyanoaurate can be recovered and then precipitated using electroplating or other techniques to isolate the metallic gold. Fluids which are suitable for use with the present invention can include, but are certainly not limited to, potable water, mine effluent, mine waste, industrial effluents, settling ponds, evaporation ponds, contaminated natural bodies of water, underground water tables, or the like.

The method of removing target compounds from a liquid can produce high recovery yields because of the selective nature of the beads. In one embodiment, the removal method can recover from about 50% to about 99.99% of the target compound. In a preferred embodiment, the removal method can recover from about 75% to about 99.99% of the target compound. In another embodiment, the removal method can lower the resulting target compound concentration of the liquid to a level on the order of parts per million (ppm), and preferably parts per billion (ppb). The method of removal can be tailored to provide specific concentration levels as found in current and proposed regulatory schemes known to those skilled in the art. In one embodiment, the method of removal can be used on liquids with various pH levels. Specifically, the liquid can have a pH in the range of 1 to 13.

In one embodiment, the cationic molecularly imprinted polymer bead can have a porous structure containing a plurality of complexing cavities spatially oriented for binding a specific target compound. As previously discussed, the complexing cavities can be formed by cationic ligands having an octanol water partition coefficient with an absolute value from about 1 to about 10; and preferably from about 1.0 to about 3.0. Additionally, after binding a specific target compound, the bead can form a target cationic ligand complex having an octanol water partition coefficient with an absolute value from about 1 to about 10; and preferably from about 1.0 to about 3.0. The cationic molecularly imprinted polymer bead can contain different complexing cavities for binding different target compounds. The cationic molecularly imprinted polymer bead can contain ligands such as those listed above, although other suitable ligands may be chosen based on the considerations and discussions herein. In one currently preferred embodiment, the target compound can be arsenate, arsenite, nitrate, nitrite, cyanide, dicyanoaurate or dicyanoargentate.

The cationic molecularly imprinted polymer bead can have a dendritic pore structure that effectively maximizes the surface area available for complexing target compounds. A dendritic pore structure contains multiple-branching of pores vastly increasing the surface area of the bead while the overall volume of the bead remains constant. A dendritic structure can be referred to as a natural fractal pattern, which is also known as a recursive pattern or self-similar structure and having macroporous, mesoporous, and/or microporous structure. The pore structure of the cationic molecularly imprinted polymer bead can be polymerized to the extent that the target compounds have access to and from the complexing cavities through a majority of the individual pores. The interior pore structure can be controlled through the various polymer reactions that form the bead. In one embodiment, the cationic molecularly imprinted polymer bead can be formed by suspension polymerization, e.g. where the ligand is desirably more soluble in the organic phase. Suspension polymerization allows control of the bead size by the amount of shear induced upon the solution in the polymerization reactor. In another embodiment, the cationic molecularly imprinted polymer bead can be formed by reverse suspension polymerization, e.g. where the ligand is more favorably soluble in the aqueous phase. The overall size of the bead can have a diameter from about 50 microns to about 1.5 millimeters. In another embodiment, the cationic molecularly imprinted polymer bead can be cross-linked to a specific degree that provides a desired rigidity but also maintains high uptake of the target compound through the pores. Although beads are a preferred structure for molecularly imprinted polymers, other shapes could be used by the methods and compositions of the present invention.

EXAMPLES

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

Example 1

N-(4-vinylbenzyl)-N-decyl-N,N-dimethylammonium chloride

Dimethyl decyl amine (9.30 g, 50 mmol) and 4-vinylbenzylchloride (7.63 g, 50 mmol) were added to ether (20 mL) and were allowed to stir for 12 hours. A yellow solid precipitated and was subsequently collected by filtration resulting in 3 g (17% yield). The ether was removed and the remaining solution was allowed to react neat for 24 hours giving a near quantitative yield after washing with ether. Subsequent reactions were performed neat. $^1$H-NMR (90 MHz, CDCl$_3$, δ): 7.68-7.38 (dd, 4H); 6.87-6.56 (dd, 1H); 5.89-5.70 (d, 1H); 5.41-5.29 (d, 1H); 5.09 (s, 2H); 3.51 (bs, 2H); 3.31 (s, 6H); 1.81 (bs, 2H) 1.25 (bs, 14H); 0.92-0.81 (t, 3H).

Example 2

N-(4-Vinylbenzyl)-N-Methylglucamine

N-Methylglucamine (9.76 g, 50 mmol) was dissolved in hot methanol (200 mL), whereupon 4-vinylbenzylchloride (7.63 g, 50 mmol) and sodium carbonate (6 g) were added to the reaction. The mixture was allowed to reflux overnight. The solution was filtered, the methanol was removed, the residue taken up in hot chloroform and filtered. A precipitate formed in the eluent, which was heated until all solids dissolved and the solution was allowed to cool to 4° C. Filtration gave 14 g (90% yield) of white powder. $^1$H-NMR (90 MHz, DMSO-d$_6$, δ): 7.33-7.28 (d, 4H); 6.86-6.83 (dd, 1H); 5.85-5.64 (d, 1H); 5.25-5.12 (d, 1H); 2.11 (s, 3h).

Example 3

N-(4-Vinylbenzyl)-N-decyl-N-methylglucammonium iodide

N-(4-vinylbenzyl)-N-methylglucamine (3 g, 9.6 mmol) was dissolved in DMF (10 mL) and iodododecane (4 g, 15 mmol) was added. The solution was heated to 60° C. for 24 hours before a second addition of 1-iodododecane (1 g, 3.75 mmol). The solution was allowed to stir for an additional 16 hours before cooling to room temperature and removing the DMF. The residue was taken up into chloroform and the solution was precipitated into hexanes twice. Filtration gave 5.25 g (91 % yield) of a gummy yellow product. $^1$H-NMR (90 MHz, CDCl$_3$, δ): 7.32-7.14 (dd, 4H); 6.79-6.50 (dd, 1H); 5.75-5.56(d, 1H); 5.23-5.10 (d, 1H); 4.92 (s, 2H); 3.51.

Example 4

N-(4-Vinylbenzyl)-N,N-Dimethylglucamine

N-(4-vinylbenzyl)-N-methylglucamine (3 g, 9.6 mmol) was dissolved in hot THF (50 mL) and iodomethane (2.28 g, 16 mmol) in THF was added. The solution was heated to reflux for 3 hours before cooling to room temperature and removing the THF. The residue was taken up into chloroform and the resulting precipitate isolated by filtration, which was washed with THF. Recrystallization from methanol gave 2 grams (46% yield based on N-(4-vinylbenzyl)-N-methylglucamine) of product. $^1$H-NMR (90 MHz, DMSO-d$_6$, δ): 7.57 (s, 4H); 6.86-6.64 (dd, 1H); 6.02-5.84 (d, 1H); 5.42-5.31 (d, 1H); 3.02 (s, 3h); 2.98 (s, 3H).

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A cationic molecularly imprinted polymer bead comprising a porous structure having a plurality of complexing cavities therein, wherein the complexing cavities contain cationic ligands spatially oriented for binding a specific inorganic target compound, and when said bead contains the specific target compound, a target cationic ligand complex is formed having an octanol water partition coefficient with an absolute value of about 1 to about 10.

2. The cationic molecularly imprinted polymer bead of claim 1, wherein the bead contains different complexing cavities for binding different target compounds.

3. The cationic molecularly imprinted polymer bead of claim 1, wherein the cationic ligand is selected from the group consisting of cationic oxygen containing heterocyclics, cationic nitrogen containing heterocyclics, cationic sulfur containing heterocyclics, cationic phosphorous containing heterocyclics, ammonium salts, phosphonium salts, acylinium salts, metallocenium salts, amidinium salts, imminium salts, trityl salts, and mixtures thereof.

4. The cationic molecularly imprinted polymer bead of claim 1, wherein the target compound is arsenate, arsenite, nitrate, nitrite, cyanide, dicyanoaurate, or dicyanoargentate.

5. The cationic molecularly imprinted polymer bead of claim 1, wherein the bead has a diameter of about 50 microns to 1.5 mm.

6. The cationic molecularly imprinted polymer bead of claim 1, wherein the octanol water partition coefficient has an absolute value from about 1.0 to about 3.0.

7. The cationic molecularly imprinted polymer bead of claim 1, wherein the bead is cross-linked.

* * * * *